United States Patent [19]
Ding et al.

[11] Patent Number: 6,141,703
[45] Date of Patent: Oct. 31, 2000

[54] INTERRUPT SHARING SYSTEM ASSIGNING EACH INTERRUPT REQUEST SIGNAL TO A SELECT ONE OF SYSTEM INTERRUPT SIGNALS BASED ON CHARACTERISTIC DATA OF EACH PERIPHERAL DEVICE

[75] Inventors: Jiangang Ding, San Jose; Kamran Mostafavi, Daly City; Phillip Pham, Milpitas; Kai Xu, Cupertino, all of Calif.

[73] Assignee: Hewlett-Packard Company, Palo Alto, Calif.

[21] Appl. No.: 09/120,679

[22] Filed: Jul. 21, 1998

[51] Int. Cl.[7] .................................................. G06F 13/10
[52] U.S. Cl. ............................. 710/10; 710/8; 710/16; 710/104
[58] Field of Search ................................. 710/8, 264, 48, 710/16, 104, 260, 266; 709/104

[56] References Cited

U.S. PATENT DOCUMENTS

| | | | |
|---|---|---|---|
| 5,148,595 | 9/1992 | Fujiyama et al. | 395/725 |
| 5,475,846 | 12/1995 | Moore | 395/733 |
| 5,519,860 | 5/1996 | Liu et al. | 707/7 |
| 5,530,875 | 6/1996 | Wach | 395/737 |
| 5,535,420 | 7/1996 | Kardach et al. | 395/868 |
| 5,615,389 | 3/1997 | Mayfield et al. | 395/828 |
| 5,764,996 | 6/1998 | Armstrong et al. | 710/260 |
| 5,809,329 | 9/1998 | Lichtman et al. | 710/8 |

OTHER PUBLICATIONS

MindShare, Inc. by Tom Shanley/Don Anderson, "PCI System Architecture" Third Edition, covers PCI Revision 2.1—Chapter 11 "Interrupt–Related Issues", pp. 209–230 (1997).

*Primary Examiner*—Thomas C. Lee
*Assistant Examiner*—Ilwoo Park
*Attorney, Agent, or Firm*—Clare T. Hartnett

[57] ABSTRACT

A mechanism that automatically configures the manner in which interrupt signals are shared in order to avoid system failures and improves the system performance is herein disclosed. The mechanism executes as part of the system BIOS during system initialization or reset. The mechanism utilizes information found in the configuration register space to determine the characteristics of the device. The device characteristics are used to determine which devices share IRQ signals. In this manner, devices that cause system failures due to sharing interrupt signals are not assigned a common interrupt signal thereby minimizing system failures and improving the overall system performance.

17 Claims, 9 Drawing Sheets

FIG. 9

INTERRUPT SHARING SYSTEM ASSIGNING EACH INTERRUPT REQUEST SIGNAL TO A SELECT ONE OF SYSTEM INTERRUPT SIGNALS BASED ON CHARACTERISTIC DATA OF EACH PERIPHERAL DEVICE

FIELD OF THE INVENTION

The present invention relates generally to computer systems. More particularly, the invention relates to an interrupt sharing mechanism for use in an interrupt-driven computer system.

BACKGROUND OF THE INVENTION

Interrupts are a commonly used mechanism for peripheral devices to request the service of a central processing unit (CPU). For example, a parallel port connected to a printer can generate an interrupt to the CPU requesting that the CPU transmit additional characters to the printer. In this way, the CPU is able to perform other tasks until the printer requires service.

Figure 1A:
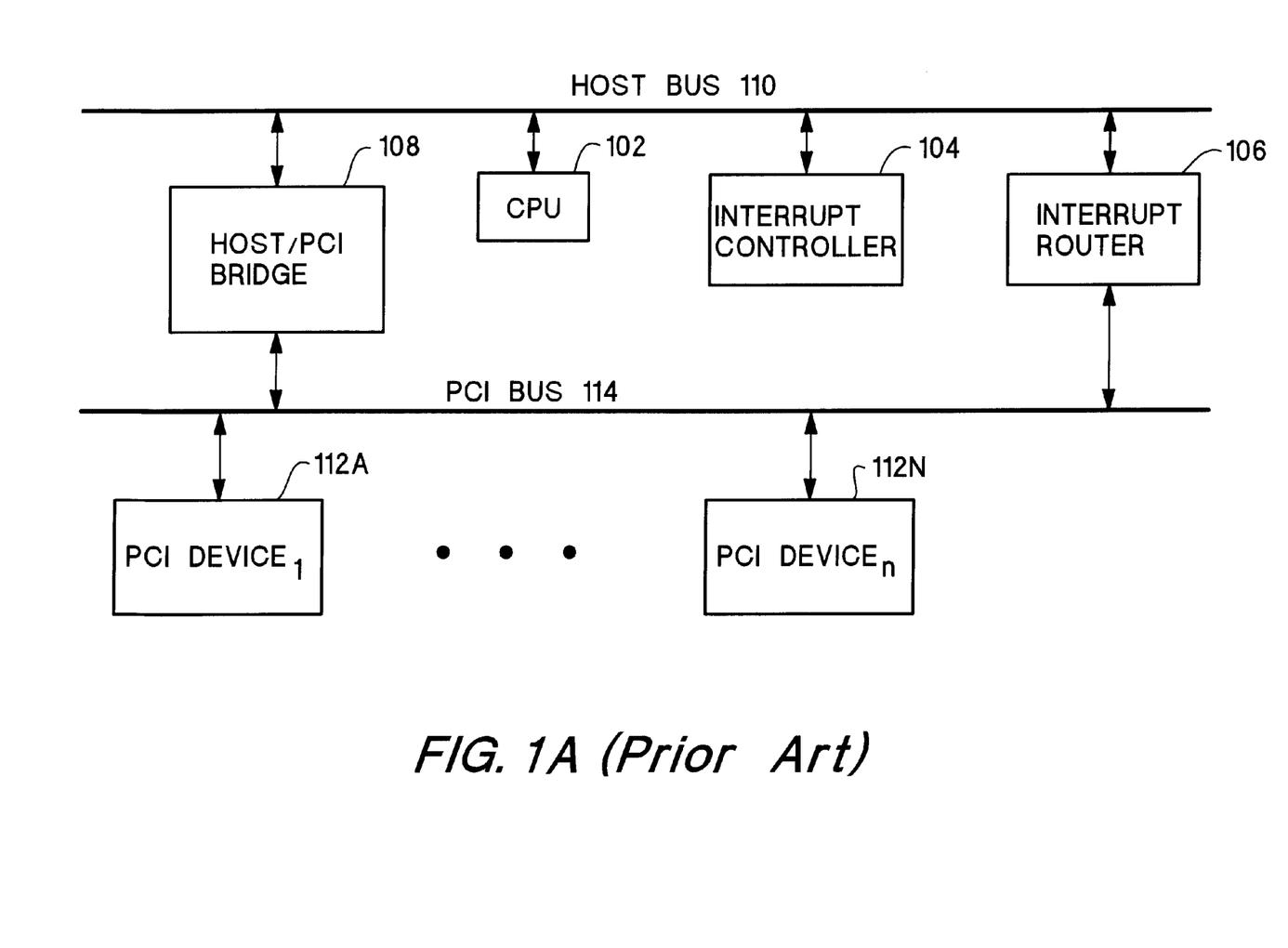
FIG. 1A illustrates an exemplary prior art computer system.

FIG. 1A illustrates an exemplary interrupt-driven computer system 100. There is shown a CPU 102, an interrupt controller 104, an interrupt router 106, and a host/PCI bridge 108, each of which are connected to a host bus 110. One or more peripheral component interface (PCI) devices 112A–112N are connected to a PCI bus 114. In addition, the host/PCI bridge 108 and the interrupt router 106 are connected to the PCI bus 114.

A PCI device 112 can be either an add-in board inserted into a PCI slot or a component embedded on the PCI bus 114. Four interrupt pins are associated with each PCI device 112 and are herein referred to as pin A, pin B, pin C, and pin D. Pin A is typically associated with the INTA# interrupt signal, pin B is associated with the INTB# interrupt signal, pin C is associated with the INTC# interrupt signal and pin D is associated with the INTD# interrupt signal. Typically, single-function PCI devices utilize pin A and multi-function PCI devices can utilize more than one interrupt pin.

Figure 1B:
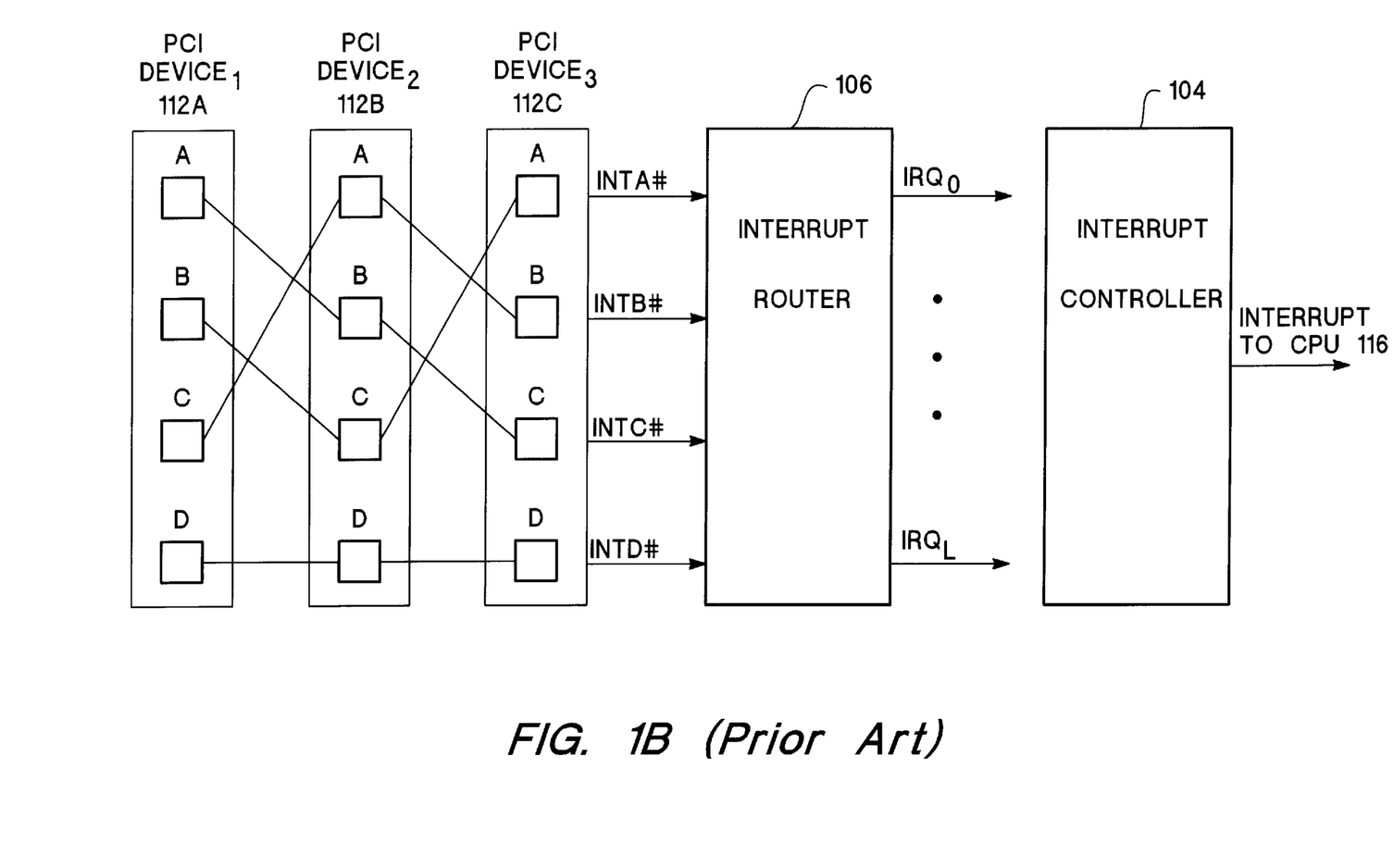
FIG. 1B illustrates the sharing of interrupt signals for the computer system shown in FIG. 1A.

The interrupt pins associated with each PCI device 112 can be connected to the system board traces or interrupt signals in a variety of ways. One such way is shown in FIG. 1B where the interrupt signals are shared between the PCI devices. The interrupt signals are shared in order to efficiently balance the load on each interrupt signal.

There is shown three PCI devices, 112A, 112B, 112C, where the interrupt traces or signals are shared between the three PCI devices, 112A–112C. Interrupt trace or signal INTA# is tied to interrupt pin B of PCI device$_1$ 112A, interrupt pin C of PCI device$_2$ 112B, and interrupt pin A of PCI device$_3$ 112C. Interrupt signal INTB# is tied to interrupt pin C of PCI device$_1$ 112A, interrupt pin A of PCI device$_2$ 112B, and interrupt pin B of PCI device$_3$ 112C. Likewise, interrupt signal INTC# is tied to interrupt pin A of PCI device$_1$ 112A, interrupt pin B of PCI device$_2$ 112B, and interrupt pin C of PCI device$_3$ 112C. All of the D pins are tied to the INTD# signal.

Each of the interrupt signals, INTA#–INTD#, is hardwired to a separate input of an interrupt router 106. The interrupt router 106 is used to assign each interrupt signal, INTA#–INTD#, to a specific interrupt request line, IRQ$_1$–IRQ$_L$. The interrupt controller 104 receives the interrupt request lines, IRQ$_1$–IRQ$_L$, and in response asserts a corresponding interrupt request 116 to the CPU 102.

A drawback with the interrupt sharing scheme described above is that some PCI devices are not capable of sharing interrupt signals with other PCI devices. For example, when a small computer system interface (SCSI) controller designed by one manufacturer is sharing an interrupt signal with a network interface card designed by a different manufacturer, a system failure sometimes occurs. At times this is attributable to problems with the device drivers associated with a particular PCI device. In this case, the PCI devices are moved around in the various PCI slots in order to prevent the troublesome devices from sharing the same interrupt signal. These failures and the manual intervention required to reconfigure the PCI devices impedes the overall performance of the computer system. Accordingly, there exists a need for a mechanism that can overcome this shortcoming.

SUMMARY OF THE INVENTION

The present invention pertains to a mechanism that automatically configures the manner in which interrupt signals are shared in order to avoid system failures. A computer system embodying the technology of the present invention includes a CPU coupled to an interrupt controller. The CPU receives interrupts from the interrupt controller. An interrupt router is coupled to the interrupt controller and a PCI bus. The interrupt router receives interrupt request signals from the various PCI devices connected to the PCI bus. The interrupt router generates system interrupt request (IRQ) signals in response to the interrupt request signals received from the PCI devices. The number of interrupt request signals can exceed the number of IRQ signals. The interrupt router is programmed by an automatic interrupt routing configuration procedure with the assignments as to which interrupt request signals share IRQ signals.

The automatic interrupt routing configuration procedure executes as part of the system BIOS during system initialization or reset. The automatic interrupt routing configuration procedure utilizes the information in each PCI device's configuration register space to determine which PCI devices require interrupts and the characteristics of the device. The device characteristics include the vendor identifier, the device identifier, and the class code. The vendor identifier indicates the manufacturer of the device, the device identifier indicates the type of device, and the class code indicates the function of the device. The automatic interrupt routing configuration procedure utilizes the vendor identifier, the device identifier, and the class code to determine which devices are to share IRQ signals. Once this determination is made, the interrupt router is then programmed with the interrupt assignments.

The use of an automatic mechanism to configure the sharing of IRQ signals between PCI devices based on device characteristics is beneficial in many respects. This mechanism overcomes system failures by intelligently selecting those PCI devices that can share an IRQ signal without incurring system failures. Furthermore, this mechanism does not require manual intervention. A user does not need to be aware of the devices that cannot share interrupts or know how to avoid such sharing. As such, the automatic interrupt routing configuration procedure eliminates manual intervention thereby improving the overall performance of the computer system.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
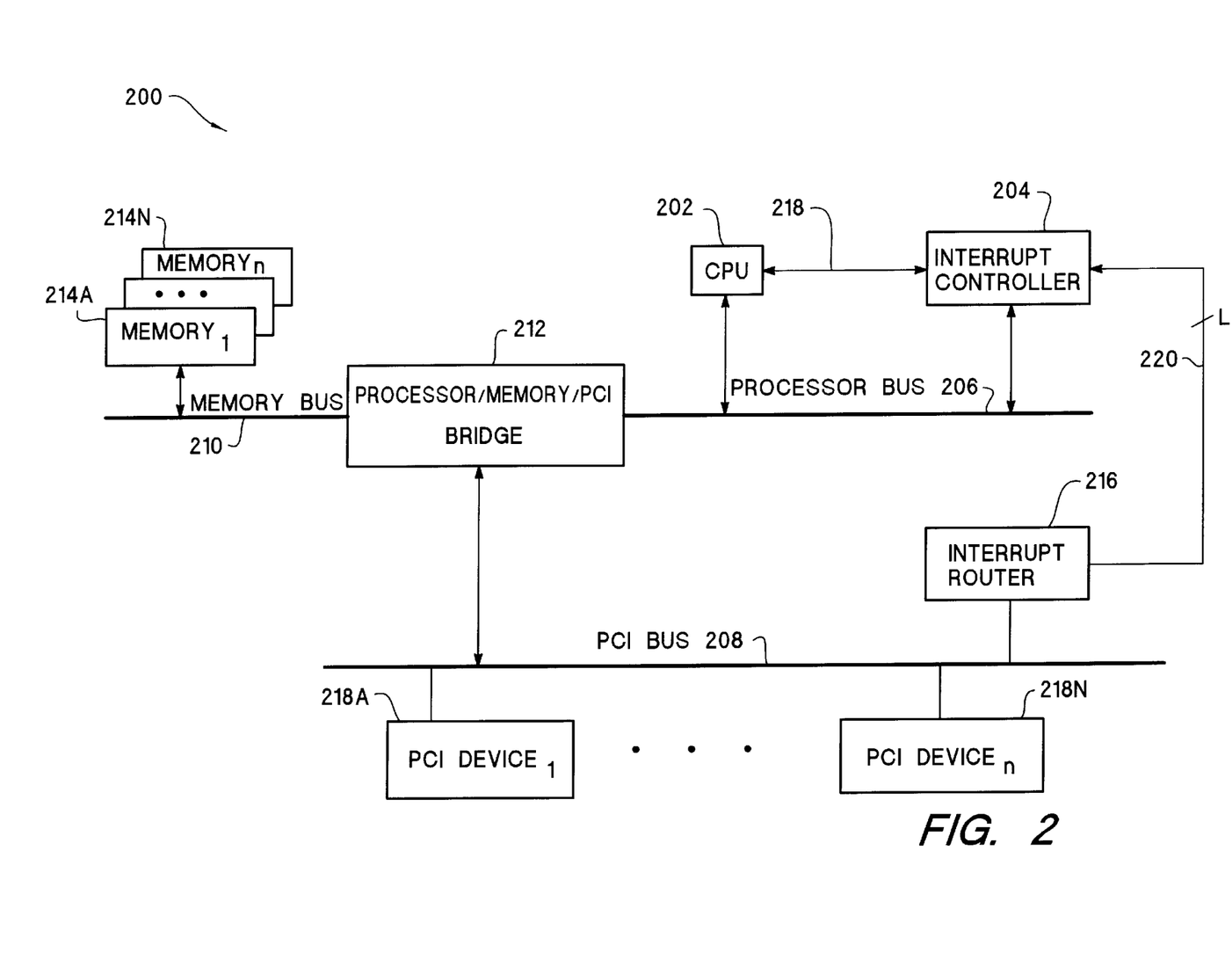
FIG. 2 illustrates a computer system utilizing the technology of the present invention.

FIG. 2 illustrates a computer system 200 employing the technology of the present invention. There is shown a computer system 200 including a CPU 202 and an interrupt controller 204 connected to a processor bus 206. The processor bus 206 is connected to a PCI bus 208 and a memory bus 210 through a processor-to-memory-to-PCI bridge 212. One or more memory devices 214A–214N are connected to the memory bus 210. An interrupt router 216 and one or more other PCI devices 218A–218N are connected to the PCI bus 208.

The CPU 202 controls the functions of the computer system 200. The CPU 202 receives interrupts 218 from the interrupt controller 204. The CPU 202 can be any type of microprocessor or processor element, such as but not limited to the Intel X86 family of microprocessors and the interrupt controller 204 can be any type of interrupt controller, such as but not limited to the Intel 8259 interrupt controller. It should be noted that additional devices are connected to the processor bus 206 which are not shown.

The memory 214 can be any type of memory device including but not limited to synchronous dynamic random access memory (SDRAM), dynamic random access memory (DRAM), read-only memory (ROM) devices, or any combination of memory technologies, and the like.

The PCI devices 218A–218N can be either add-in boards that reside in a PCI slot or embedded components that are tied to the PCI bus 208. Examples of such devices 218 include, but are not limited to, network interface controllers, SCSI controllers, RAID controllers, video adapters, bus bridges, and the like.

The operation of the PCI bus 208 is well known in the art. Interrupt request signals INTA#, INTB#, INTC#, and INTD# are part of the PCI bus 208. A more detailed description of the PCI bus can be found in Solari and Willse, *PCI Hardware and Software Architecture and Design,* 4th edition, Annabooks (1998), in Mindshare, *PCI System Architecture,* 3rd edition, Addison Wesley (1996), and in *PCI Specification* rev. 2.1 from the PCI Special Interest Group, (www.pcisig.com), each of which are hereby incorporated by reference as background information.

An interrupt router 216 is a PCI device that receives the PCI bus interrupt request signals, INTA#, INTB#, INTC#, and INTD#, from the devices connected to the PCI bus 208 and which generates a corresponding system interrupt request signal (herein referred to as IRQ signals) $IRQ_1$–$IRQ_L$ 220 that is transmitted to the interrupt controller 204. Preferably, the interrupt router 216 is a programmable multiplexer.

Figure 3:
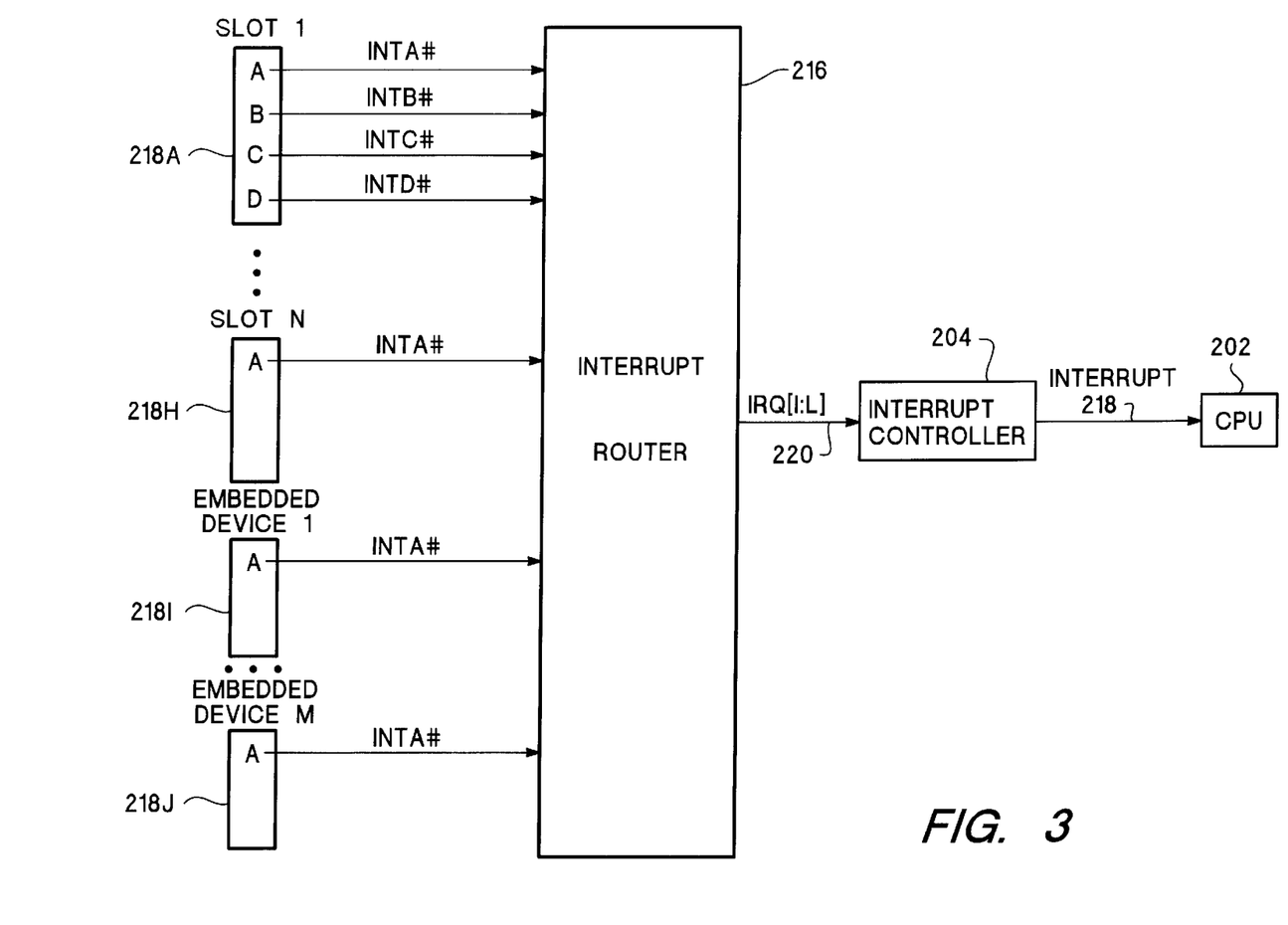
FIG. 3 illustrates the interrupt routing mechanism for the computer system shown in FIG. 2

FIG. 3 illustrates the interaction of the components shown in FIG. 2 that control the interrupt processing ongoing in the computer system 200. The interrupt router 216 receives each of the interrupt request signals that emanate from the PCI devices 218 and generates a corresponding IRQ signal. The interrupt controller 204 receives the IRQ signals and generates the appropriate interrupt 218 to the CPU 202.

The interrupt router 216 can receive at most (4×n)+m interrupt request signals, where n is the number of add-in-board PCI devices and m is the number of embedded PCI devices. For example, in one embodiment n can be 8 and m can be 4 thereby providing 36 interrupt request signals that are routed to the interrupt router 216. It should be noted that the present invention is not limited to any particular number of interrupt request signals.

As shown in FIG. 3, in PCI slot 1 there is multi-function PCI device 218A that uses four interrupt pins. Thus, there are four interrupt request signals, INTA#, INTB#, INTC#, and INTD# that are tied from the respective interrupt pins from PCI slot 1 to the interrupt router 216. In addition, in PCI slot n there is a single-function PCI device 218H that only uses interrupt pin A. Thus, there is a single INTA# signal that is tied from PCI slot n to the interrupt router 216. Similarly, there is a first embedded device 218I that uses interrupt pin A and has a single INTA# signal tied to the interrupt router 216. A second embedded device 218J uses interrupt pin A and has a single INTA# signal tied to the interrupt router 216. It should be noted that the present invention is not constrained to any particular number or types of PCI devices and those shown in FIG. 3 are for illustration purposes only. The terms "interrupt pin", "interrupt request", and "interrupt request signal" are used herein interchangeably.

The interrupt router 216 receives these interrupts and generates one or more IRQ signals 220 which are transmitted to the interrupt controller 204. Based on the particular asserted IRQ signal 220, the interrupt controller 204 generates a corresponding interrupt 218 to the CPU 202.

Figure 4:
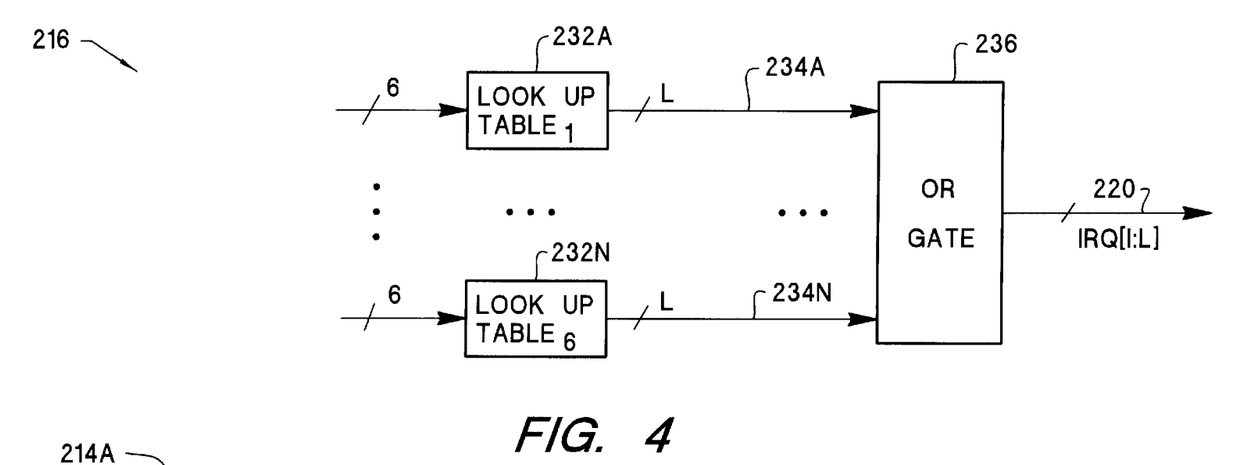
FIG. 4 illustrates the components of the interrupt router shown in FIGS. 2–3.

FIG. 4 illustrates the components of the interrupt router 216. There is shown six look up tables 232A–232N, each receiving six interrupt request signals and each generating L output signals 234A–234N, where L is the number of IRQ signals. Preferably, L is sixteen. Each of the L-bit output signals 234 is coupled to an OR-gate 236 where the output signals 234 are ORed together bit-by-bit to form a L-bit output IRQ[1:L]. Thus, the six interrupt request signals transmitted to each look up table 232 serve as address lines to select one of the L-bits to output to the OR-gate 236. It should be noted that although the interrupt router is illustrated with six look up tables, the present invention is not constrained to this number.

Figure 5:
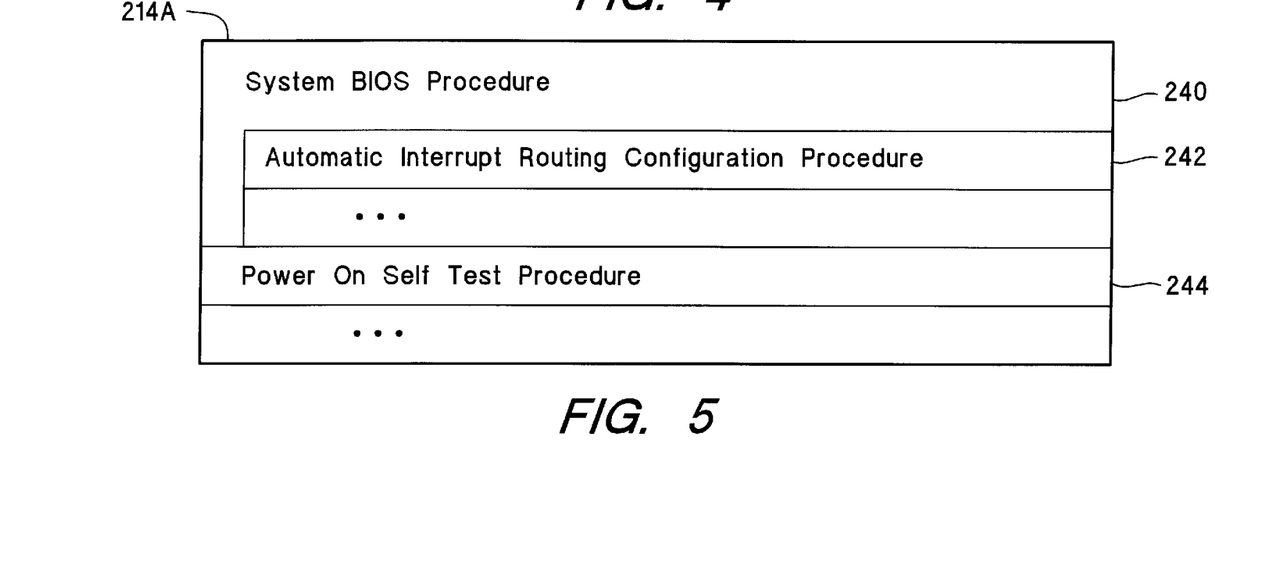
FIG. 5 illustrates a memory device shown in FIG. 2 in accordance with a preferred embodiment of the present invention.

FIG. 5 illustrates one of the memory devices 214A. The memory 214A includes a system BIOS procedure 240 that includes an automatic interrupt routing configuration procedure 242 as well as other procedures and data structures. The system BIOS procedure 240 is used to configure the components of the computer system 200. The automatic interrupt routing configuration procedure 242 is used to automatically configure the interrupts. In addition, the memory 214A includes a Power On Self Test (POST) procedure 244 that tests and initializes the individual components that are crucial to the operation of the computer system 200.

The foregoing description has described the components of the computer system embodying the technology of the present invention. Attention now turns to a description of the manner in which the computer system automatically configures the manner in which the PCI devices share interrupt signals.

Figure 6:
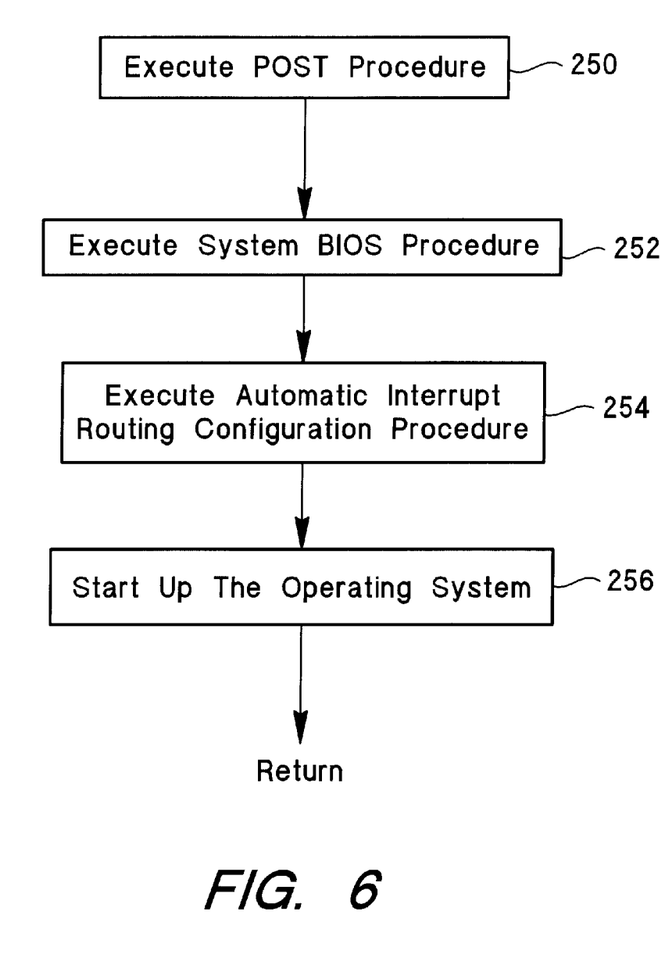
FIGS. 6–9 are flow charts illustrating the steps used to automatically configure the manner in which the interrupts are shared in accordance with a preferred embodiment of the present invention.

FIG. 6 illustrates the steps used to initialize the computer system 200. When the computer system 200 is powered-on or reset, the POST procedure 244 is initiated (step 250). The POST procedure 244 tests and initializes the individual components that are crucial to the operation of the computer system 200. Next, the system BIOS procedure 240 executes (step 252). The system BIOS procedure 240 configures the components of the computer system 200 as well as perform other tasks. The system BIOS procedure 240 determines the range of PCI buses present in the computer system 200, scans for the PCI devices connected to each PCI bus, assigns the interrupt pins to a particular interrupt signal, sets the configuration register space in each PCI device, as well as perform other tasks. A more detailed description of the POST 244 and system BIOS 240 procedures can be found in the incorporated references cited above.

A function of the system BIOS procedure 240 is to assign an IRQ signal 220 to each PCI device. The automatic interrupt routing configuration procedure 242 is used to determine how the IRQ signals are shared amongst the PCI devices (step 254). Once the interrupts are set, the system BIOS procedure 240 completes processing. The operating system is booted up and the computer system 200 is engaged for processing (step 256).

Figure 7:
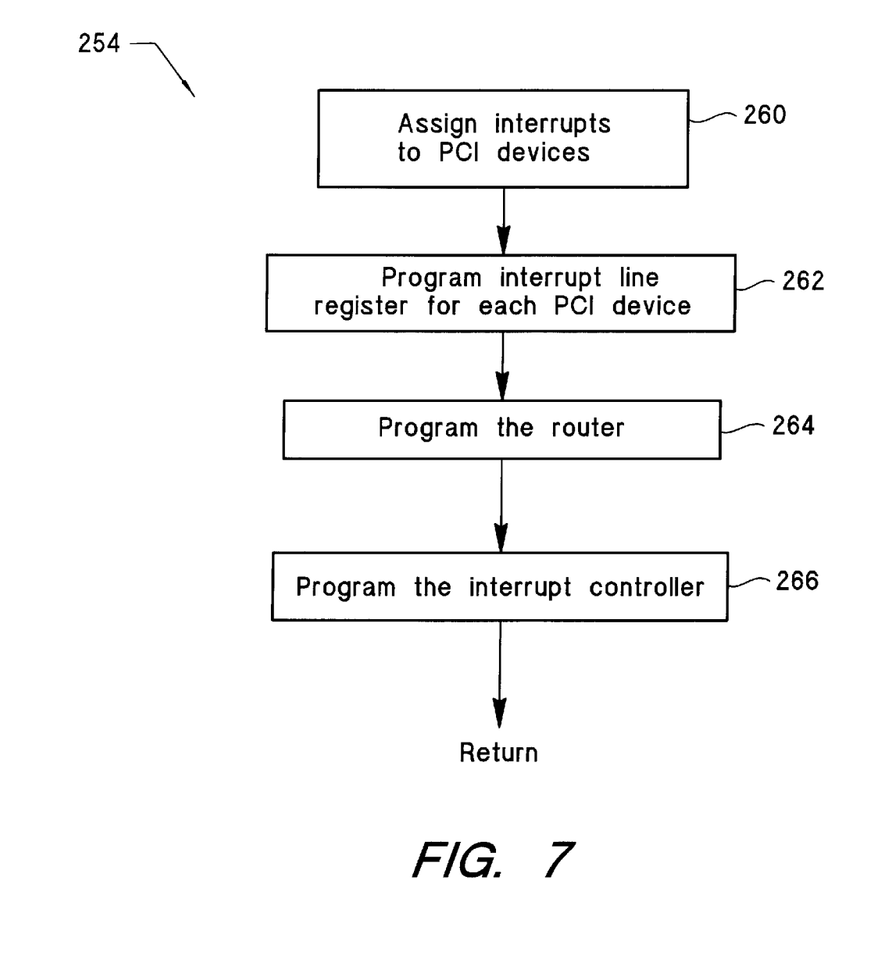

FIG. 7 illustrates the steps used by the automatic interrupt routing configuration procedure 242 to determine the manner in which the IRQ signals 220 are shared amongst the PCI devices 218. First, the IRQ signals 220 are assigned to each of the PCI devices 218 (step 260). Next, the interrupt line register associated with each PCI device's configuration register space is updated to reflect the interrupt signal assignments (step 262). The interrupt router 216 is then programmed with the interrupt signal assignments (step 264) and then the interrupt controller 204 is programmed with each IRQ signal and its associated interrupt vector (step 266).

Figure 8:
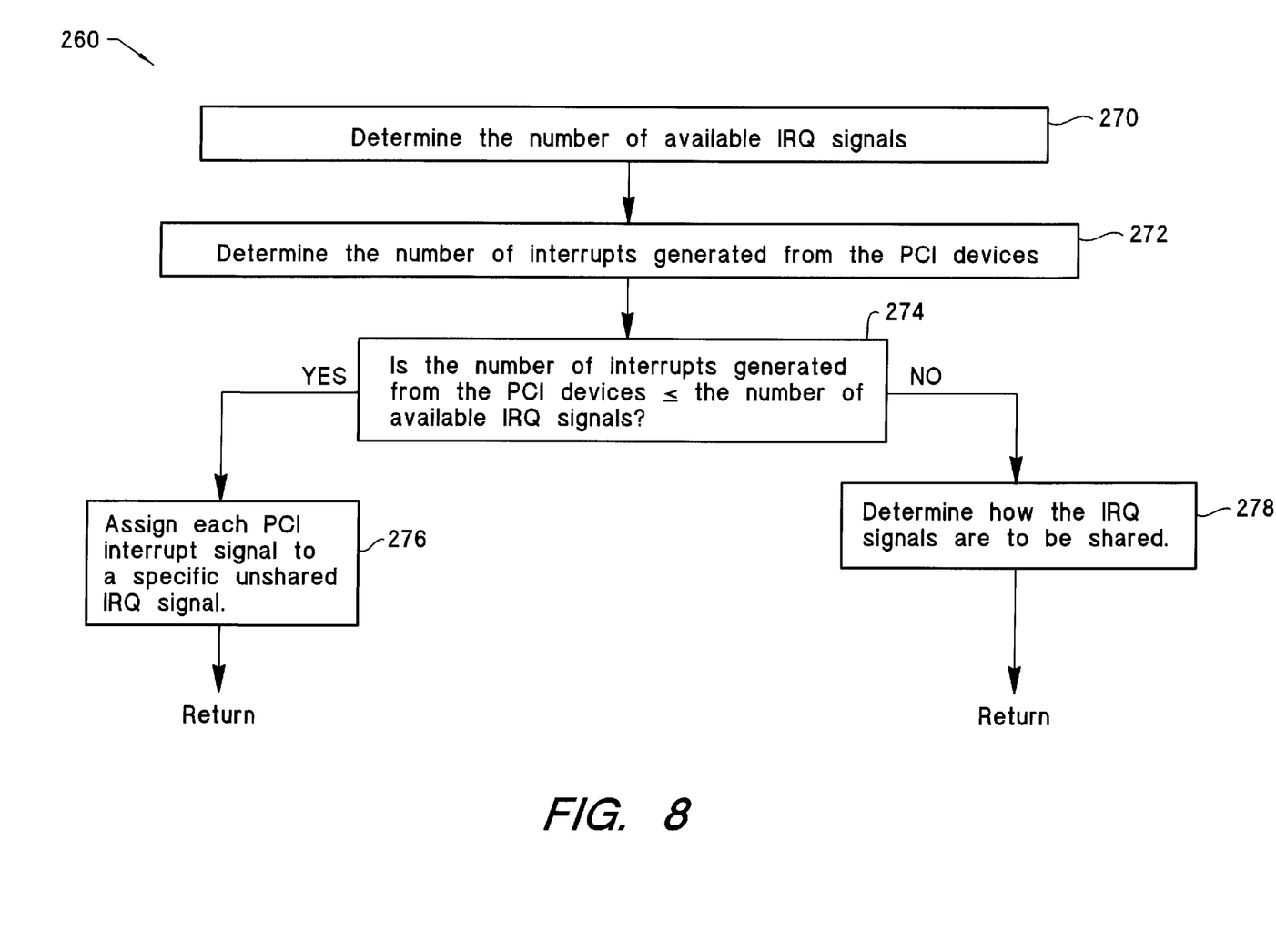

FIG. 8 illustrates the steps used by the automatic interrupt routing configuration procedure 242 to assign interrupts to PCI devices 218. The procedure 242 determines the number of IRQ signals 220 that are available (step 270). A second memory device 214B contains the assignment of the IRQ signals 220 to other system components that cannot share an IRQ signal, such as a keyboard, mouse, video display, and the like. The procedure 242 reads the appropriate information from this second memory device 214B to determine the number of IRQ signals 220 that have not been assigned and are available.

Next, the automatic interrupt routing configuration procedure 242 determines the number of interrupt requests that are generated from the PCI devices 218 (step 272). Associated with each PCI device 218 is a configuration register space that is used to configure the device so that it can interact with the PCI bus 208. An interrupt pin register is part of the configuration register space and defines which of the four PCI interrupt pins, INTA#, INTB#, INTC#, INTD#, the PCI device 218 is connected to. A zero value in the interrupt pin register indicates that the PCI device 218 does not use interrupts. The procedure 242 reads the configuration register space of each PCI device 218 to determine the number of interrupt requests that are generated from these devices.

A more detailed description of the configuration register space can be found in the incorporated references cited above.

If the number of interrupt requests from the PCI devices 218 is less than or equal to the number of available IRQ signals 220 (step 274-Y), then there is no need for the PCI devices 218 to share IRQ signals 220. In this case, each PCI interrupt request is assigned a specific IRQ signal 220 (step 276).

Otherwise, when the number of interrupts from the PCI devices 218 exceeds the number of available IRQ signals 220 (step 274-N), the automatic interrupt routing configuration procedure 242 determines how the IRQ signals 220 are to be shared between each of the interrupt requests associated with the PCI devices 218 (step 278).

Figure 9:
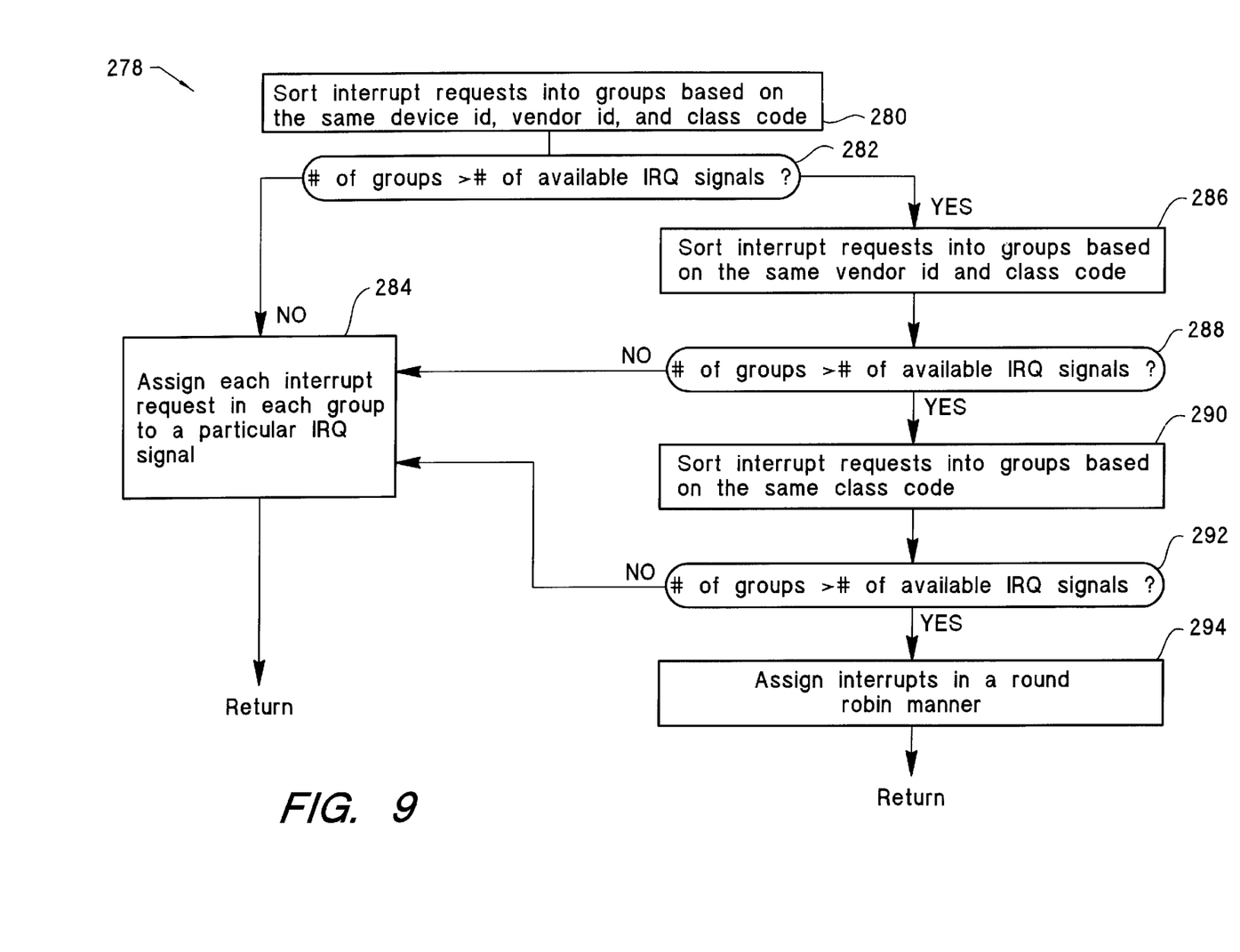

FIG. 9 illustrates the steps used by the automatic interrupt routing configuration procedure 242 to determine how the IRQ signals 220 are to be shared between the PCI devices 218. The procedure 242 sorts the interrupt requests into groups, where each group has the same device identifier, the same vendor identifier, and the same class code (step 280). The device identifier, vendor identifier, and the class code are obtained from the configuration register space associated with the PCI device 218 that corresponds to a particular interrupt request. The device identifier identifies the type of device (e.g., RAID), the vendor identifier identifies the manufacturer of the device (e.g., Hewlett-Packard Company (HP)), and the class code identifies the basic function of the device (e.g., network interface controller (NIC)). If the number of groups is less than or equal to the number of available IRQ signals 220 (step 282-N), then each interrupt request in each group is assigned to the same IRQ signal 220 (step 284).

If the number of groups exceeds the number of available IRQ signals 220 (step 282-Y), the interrupt requests are partitioned into groups based on the same vendor identifier and the same class code (step 286). If the number of groups based on this grouping are less than or equal to the number of available IRQ signals 220 (step 288-N), then each interrupt request in each group is assigned to the same IRQ signal 220 (step 284).

Otherwise (step 288-Y), the interrupt requests are grouped based on the same class code (step 290). If the number of groups based on this grouping are less than the number of available IRQ signals 220 (step 292-N), then each interrupt request in each group is assigned to the same IRQ signal 220 (step 284). Otherwise (step 292-Y), the interrupt requests are assigned to the IRQ signals 220 in a round robin manner (step 294).

The following example is used to illustrate the operation of the automatic interrupt routing configuration procedure 242. Consider a computer system having the following configuration shown in Table 1 below. It should be noted that the values shown in Table 1 are used for the illustration purposes only and are not the actual values that appear in the PCI configuration register space but are representations of the actual values.

TABLE 1

| # of Interrupt Requests | Vendor Id For | Device Id For | Class Code For |
| --- | --- | --- | --- |
| 1 | HP | Embedded NetRaid | DAC |
| 1 | HP | NetRaid | DAC |
| 1 | HP | J2585B | NIC |

TABLE 1-continued

| # of Interrupt Requests | Vendor Id For | Device Id For | Class Code For |
| --- | --- | --- | --- |
| 4 | Adaptec | ANA-6944A | NIC |
| 1 | 3COM | 3C905 | NIC |

The computer system 200 has five PCI devices 218 requiring eight interrupts. The first device, shown as the first entry in Table 1, is a Disk Array Controller (DAC) such as an embedded NetRaid device manufactured by HP which uses a single interrupt request. The second PCI device, shown as the second entry in Table 1, is an HP NetRaid controller which utilizes a single interrupt request. The third PCI device, shown as the third entry in Table 1, is an HP network interface card (NIC) which utilizes a single interrupt request. The fourth device, shown as the fourth entry, is a NIC from Adaptec which utilizes four interrupt requests. The fifth entry is a NIC from 3COM which utilizes a single interrupt request.

In the case where there are five available IRQ signals 220, the automatic interrupt routing configuration procedure 242 sorts the interrupt requests into groups, where the devices associated with each interrupt request in each group have the same vendor identifier, the same device identifier, and the same class code. For the example shown in Table 1, there are five such groups, where each group includes one of the devices shown in Table 1. Thus, the interrupt request associated with the HP embedded NetRaid controller is assigned to a first IRQ signal, the interrupt request associated with the HP NetRaid controller is assigned to a second IRQ signal, the interrupt request associated with the HP NIC is assigned to a third IRQ signal, the four interrupt requests associated with the Adaptec NIC share a fourth IRQ signal, and the interrupt request associated with the 3COM NIC is assigned to a fifth IRQ signal.

In the case where there are four available IRQ signals 220, the automatic interrupt routing configuration procedure 242 groups the interrupt requests based on the same vendor identifier and the same class code. The interrupt request associated with the HP embedded NetRaid controller and the interrupt request associated with the HP NetRaid controller share a first IRQ signal since they have the same vendor identifier (HP) and the same class code (DAC), the interrupt request associated with the HP J2585B NIC is assigned to a second IRQ signal, the four interrupt requests associated with the Adaptec NIC share a third IRQ signal, and the interrupt request associated with the 3COM NIC is assigned to a fourth IRQ signal.

In the case where two IRQ signals 220 are available, the automatic interrupt routing configuration procedure 242 groups the interrupt requests based on the same class code. In the exemplary configuration, there are two class codes: DAC and NIC. The interrupt request associated with the HP embedded NetRaid controller and the interrupt request associated with the HP NetRaid controller share a first IRQ signal since they each are associated with the class code of DAC. The interrupt request associated with the HP NIC, the interrupt requests associated with the Adaptec NIC, and the interrupt request associated with the 3COM NIC share a second IRQ signal since they each are associated with the class code of NIC.

The automatic interrupt routing configuration procedure 242 is beneficial for overcoming system failures by intelligently selecting non-conflicting PCI devices 218 to share an IRQ signal 220. This configuration is performed automatically thereby alleviating manual intervention. In addition, a user does not need to be aware of the devices that cannot share interrupts or of determining the manner in which to alleviate such sharing. As such, the overall usability and ease of configuration is improved.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

It should be noted that the present invention is not constrained to any particular device characteristics or source of such characteristics or attributes. Other device characteristics from the PCI configuration register space can be used such as but not limited to the revision identifier or the like.

The source of the attributes which can be used to determine the sharing of the interrupt signals is not constrained to the device characteristics found in the PCI configuration space. Other sources of such attributes can include device driver attributes, performance monitoring data, and operating system attributes. For example, the device drivers can contain information that can be used in the interrupt routing determination as well as information obtained from the operating system or systems associated with the interrupt devices. In addition, statistical or other data obtained from a performance monitoring device can be used to make a runtime determination of the manner in which the interrupt signals are shared. In this particular embodiment, the automatic interrupt routing configuration procedure 242 will not operate at system initialization or reset but rather during runtime and may be part of the operating system's runtime environment.

What is claimed is:

1. A method for operating a computer system, the method comprising the steps of:

providing a plurality of peripheral devices that generate interrupt request signals;

providing a plurality of system interrupt signals, the number of system interrupt signals less than the number of interrupt request signals;

obtaining characteristic data on each of the peripheral devices; and using the characteristic data to assign each interrupt request signal to a select one of the system interrupt signals.

2. The method of claim 1, the obtaining step comprising the steps of:
- associating with each peripheral device, a storage area including the characteristic data for the peripheral device; and
- accessing each of the storage areas for the characteristic data associated with the peripheral devices.

3. The method of claim 1, the using step comprising the steps of:
- determining a number of available system interrupt signals;
- determining a number of interrupt request signals; and
- assigning each of the interrupt request signals to a select one of the system interrupt signals when the number of available system interrupt signals does not exceed the number of interrupt request signals.

4. The method of claim 3, further comprising the steps of:

when the number of interrupt request signals exceeds the number of available system interrupt signals,
- forming a first set of characteristic data from each of the devices,
- grouping the interrupt request signals into a plurality of groups based on the first set, and
- for each group, assigning each of the interrupt request signals in a select group to a select one of the system interrupt signals, when the number of groups does not exceed the number of available system interrupt signals.

5. The method of claim 4, when the number of groups exceeds the number of available system interrupt signals,
- forming a second set of characteristic data from each of the peripheral devices;
- grouping the interrupt request signals into a number of sets based on the second set; and
- for each set, assigning each interrupt request signal in a select one of the sets to a select one of the system interrupt signals, when the number of sets does not exceed the number of available system interrupt signals.

6. The method of claim 5, when the number of sets exceeds the number of available system interrupt signals,
- forming a third set of characteristic data from each of the peripheral devices;
- grouping the interrupt request signals into a number of bunches based on the third set; and
- for each bunch, assigning each interrupt request signal in a select bunch to a select one of the system interrupt signals, when the number of bunches does not exceed the number of available system interrupt signals.

7. The method of claim 6, when the number of bunches exceeds the number of available system interrupt signals,
- assigning each interrupt request signal to a select one of the system interrupt signals in a round robin manner.

8. The method of claim 4, wherein the first set of characteristic data includes a vendor identifier, a device identifier, and a class code.

9. The method of claim 5, wherein the second set of characteristic data includes a device identifier and a class code.

10. The method of claim 6, wherein the third set of characteristic data includes a class code.

11. A computer readable storage medium for use in a computer system including a plurality of system interrupt signals and a plurality of peripheral devices having a number of interrupt request signals that exceeds the number of system interrupt signals, said apparatus comprising:
- an automatic interrupt routing configuration procedure including instructions to automatically assign each interrupt request signal to a select one of the system interrupt signals in accordance with a criteria based on the characteristics of the peripheral devices.

12. The apparatus of claim 11, the automatic interrupt routing configuration procedure further including instructions to obtain from each peripheral device a set of device characteristics and to use the device characteristics to assign each interrupt request signal to a select one of the system interrupt signals.

13. The apparatus of claim 12, the automatic interrupt routing configuration procedure further including instructions to group the interrupt request signals into a plurality of groups based on the device characteristics and to assign each interrupt request signal in each group to a select one of the system interrupt signals.

14. The apparatus of claim 13, wherein the device characteristics are selected from the group consisting of a vendor identifier, a device identifier, and a class code.

15. A computer system comprising:
- a plurality of system interrupt signals;
- a plurality of peripheral devices, each peripheral device associated with a set of device characteristics;
- a plurality of interrupt request signals that exceeds the number of system interrupt signals, each interrupt request signal associated with a particular peripheral device; and
- an automatic interrupt routing configuration procedure having a capability to make an assignment that routes each interrupt request signal to a select one of the system interrupt signals based on the sets of device characteristics.

16. The computer system of claim 15, comprising:
- an interrupt routing mechanism that receives each of the interrupt request signals and generates at least one of the system interrupt signals;
- wherein the automatic interrupt routing configuration procedure configures the interrupt routing mechanism with the assignment; and
- wherein the interrupt routing mechanism generates the system interrupt signals in accordance with the assignment.

17. The computer system of claim 15, wherein the device characteristics are selected from the group consisting of a vendor identifier, a device identifier, and a class code.

* * * * *